United States Patent [19]

Omura et al.

[11] Patent Number: 4,964,620
[45] Date of Patent: Oct. 23, 1990

[54] METHOD OF MANUFACTURING WEATHERSTRIP

[75] Inventors: Masayuki Omura, Tsushima; Mitsuo Hamabata, Bisai, both of Japan

[73] Assignee: Toyoda Gosei Co., Ltd., Nishikasugai, Japan

[21] Appl. No.: 382,290

[22] Filed: Jul. 20, 1989

[30] Foreign Application Priority Data

Aug. 10, 1988 [JP] Japan .................................. 63-199623

[51] Int. Cl.⁵ ........................ B29C 45/16; B29C 65/70
[52] U.S. Cl. ..................................... 264/261; 264/267
[58] Field of Search ............... 264/263, 252, 261, 267, 264/269

[56] References Cited

U.S. PATENT DOCUMENTS 4,616,446 10/1986 Okamoto ................................ 49/441
4,817,336 4/1989 Kisanuki ................................ 49/476

Primary Examiner—James Lowe
Attorney, Agent, or Firm—Cushman, Darby & Cushman

[57] ABSTRACT

A method of manufacturing a weatherstrip is provided which includes the step of connecting a first extruded component and a second extruded component, each having surface treated portions and cut to a predetermined length, by means of a molded connecting portion which is molded by forcing molding material into the cavity of a mold defined by inserting and setting the first and second extruded components in the mold. The step of molding the molded connecting portion is performed by forming separating slits in a third extruded component which is cut to a length shorter that the length of the molded connecting portion and has surface treated portions such that these separating slits extend along the surface treated portions from both ends to an intermediate section and by setting the thus prepared third extruded component in the mold such that the surface treated portions are in line with the surface treated portions of the first and second extruded components.

2 Claims, 4 Drawing Sheets

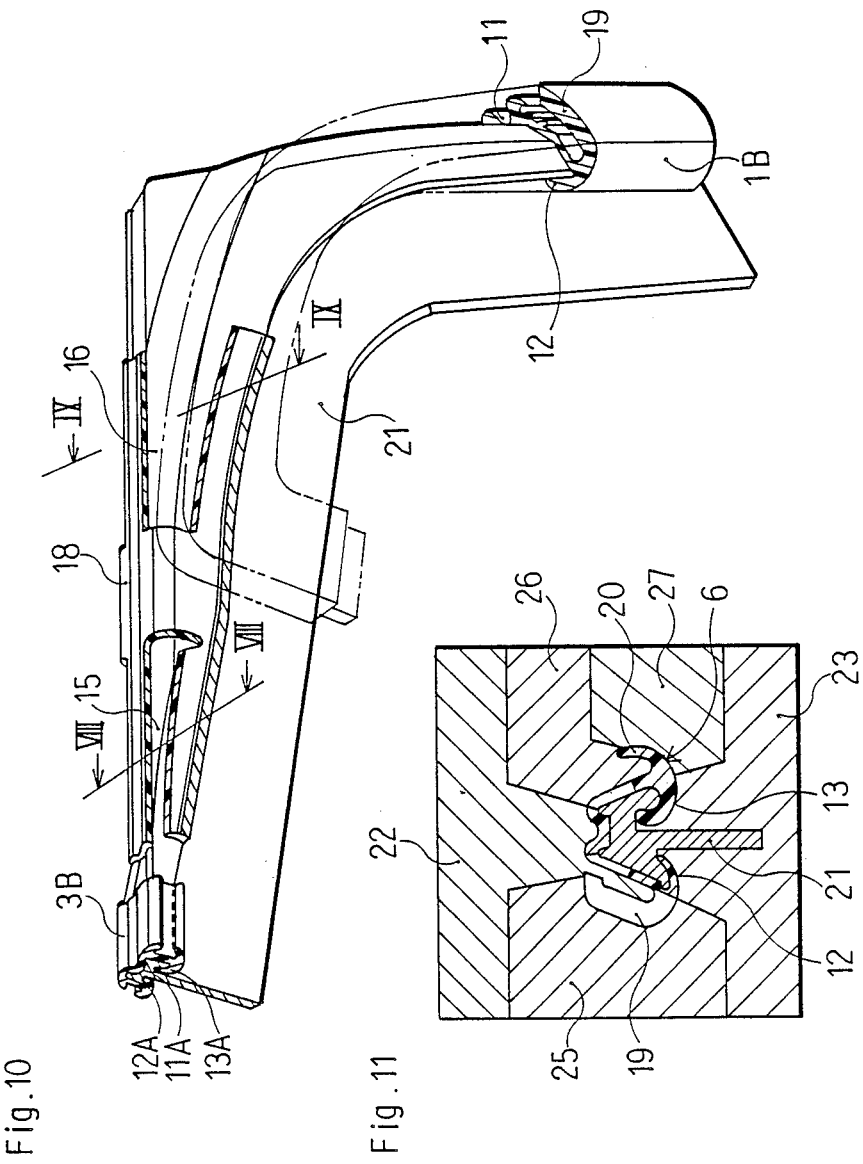

METHOD OF MANUFACTURING WEATHERSTRIP

BACKGROUND OF THE INVENTION

Field of the Invention

This invention relates to a method of manufacturing a weather strip. More particularly, the invention relates to a method of manufacturing a weatherstrip including the step of connecting a first extruded component and a second extruded component, each having surface treated portions and cut to a predetermined length, by means of a molded connecting portion (hereinafter referred to as a molded portion) which is molded by forcing molding material into a cavity defined by inserting and setting the two extruded components in a mold.

A conventional method of manufacturing a door glass-run (hereinafter referred to as a glass-run) which is a sort of weatherstrip will be described by way of example. A glass-run fitted to a front door D (FIG. 1) is shown in FIG. 2 in plan view, and in FIGS. 3 and 4 in sectional view. The conventional glass-run manufacturing method is carried out as follows:

Insert and set in a mold a first extruded component (an upper portion) 1 or 1A and a second extruded component (a lower portion) 3 or 3A, each having surface treated portions (formed by subjecting to slidability-adding treatment through urethane coating, for example) S and cut to a predetermined length, and force molding material into a cavity defined in the mold, whereby a molded portion 5 or 5A is molded whose sectional width and height are variable. Then, the individual glass slidable surfaces of the molded portion 5, 5A are subjected to slidability-adding treatment (S).

However, the size $l_1$, $l_2$ of the molded portion is fairly long (normally on the order of 25 to 30 cm), and the sectional shape of the molded portion is complicated as shown in FIGS. 2 through 4. Therefore, a large amount of molding material is required. Accordingly, the molding machine must be large and the molding process is limited to, for example, injection molding which requires that the molding material be fluid. Thus, the initial cost for manufacture increases, as do the required manhours for molding increases too.

Further, subjecting surface portions to slidability-adding treatment after molding is performed three-dimensionally on the large-sized glass-run which has a U-shaped glass slidable groove as shown in FIGS. 3 and 4. Accordingly, this surface treatment work is difficult and requires many man hours.

SUMMARY OF THE INVENTION

It is an object of the present invention to provide a method of manufacturing a weatherstrip which avoids the foregoing problems.

To achieve the foregoing object, a method of manufacturing a weatherstrip according to the present invention includes the step of connecting a first extruded component and a second extruded component, each having surface treated portions and cut to a predetermined length, by means of a molded connecting portion which is molded by forcing molding material into the cavity of a mold defined by inserting and setting the first and second extruded components in the mold, wherein the step of molding the molded connecting portion is performed by forming longitudinal slits in a third extruded component which is cut to a length shorter than the length of the molded connecting portion and has surface treated portions such that the longitudinal slits extend along the surface treated portions from both ends to an intermediate section and the thus prepared third extruded component is set in the mold such that the surface treated portions is in line with the surface treated portions of the first and second extruded components.

In the foregoing molding step, the shape of the cavity for molding of the molded portion has a simple configuration and a small volume because the extruded component with a portion notched is simply inserted in the mold. Therefore, the amount of the molding material can be reduced, the molding machine can be small, and the molding process is not necessarily limited to, for example, injection molding which demands that the molding be fluid. Thus, the initial cost for manufacturing can be decreased, as can the manhours.

Further, since portions of the extruded component are pretreated, the molded connecting portion needs no surface treatment after molding.

BRIEF DESCRIPTION OF THE DRAWINGS

FIG. 10 is a perspective view, partly broken away, showing first, second and third extruded components set in a core die in accordance with the method of the present invention; and FIG. 11 is a schematic sectional view of a mold for molding used in the method of the present invention.

DESCRIPTION OF THE PREFERRED EMBODIMENT

Figure 1:
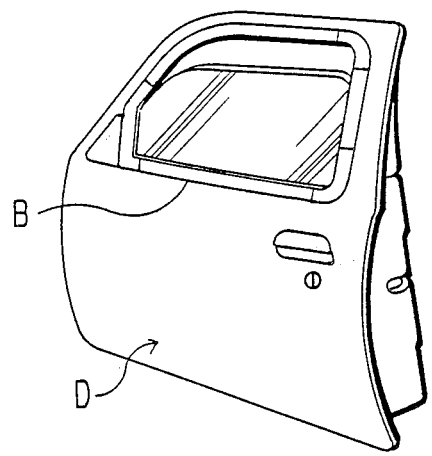
FIG. 1 is a perspective view of a front door to which a glass-run is fitted.
Figure 2:
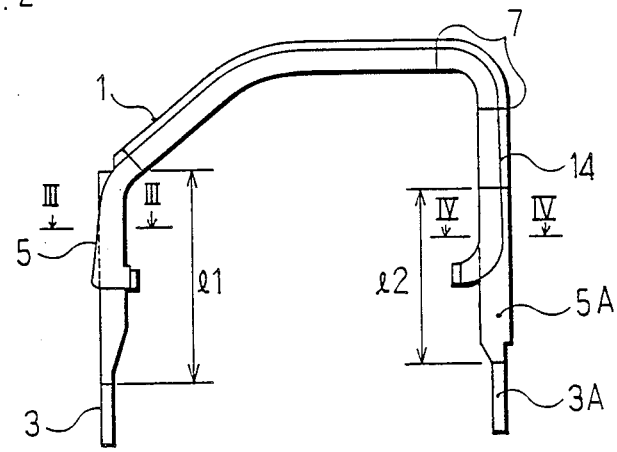
FIG. 2 is a general plan view showing an example of a glass-run manufactured in accordance with a conventional method.
Figure 3:
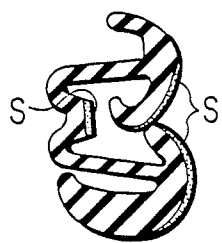
FIG. 3 is a sectional view taken along line III—III of FIG. 2.
Figure 4:
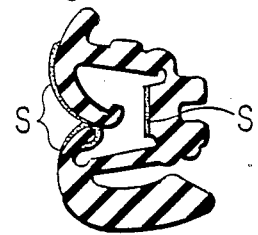
FIG. 4 is a sectional view taken along line IV—IV of FIG. 2.

A method of manufacturing a weatherstrip according to the present invention will now be described. In the drawings, parts or portions identical with those of the prior art are designated by the same reference numerals and a descriptions thereof is omitted.

Figure 5:
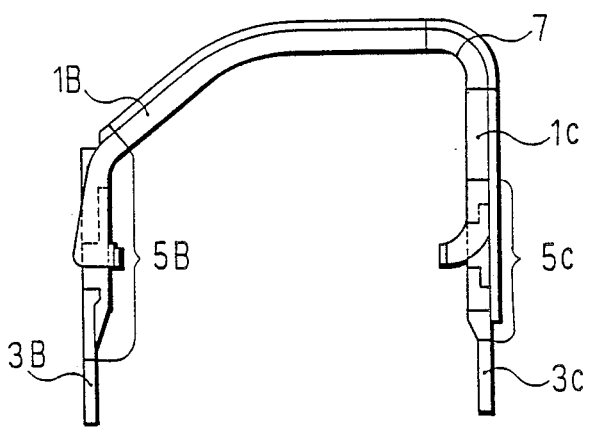
FIG. 5 is a general plan view showing an example of a glass-run (a weather strip) manufactured in accordance with the method of the present invention.

Among several steps for manufacturing a glass-run, the step of connecting an upper portion (a first extruded component) 1B and a lower portion (a second extruded component) 3B, arranged in the front section of a door belt line B, by means of a molded portion 5B will be described in particular (see FIG. 5).

Figure 6:
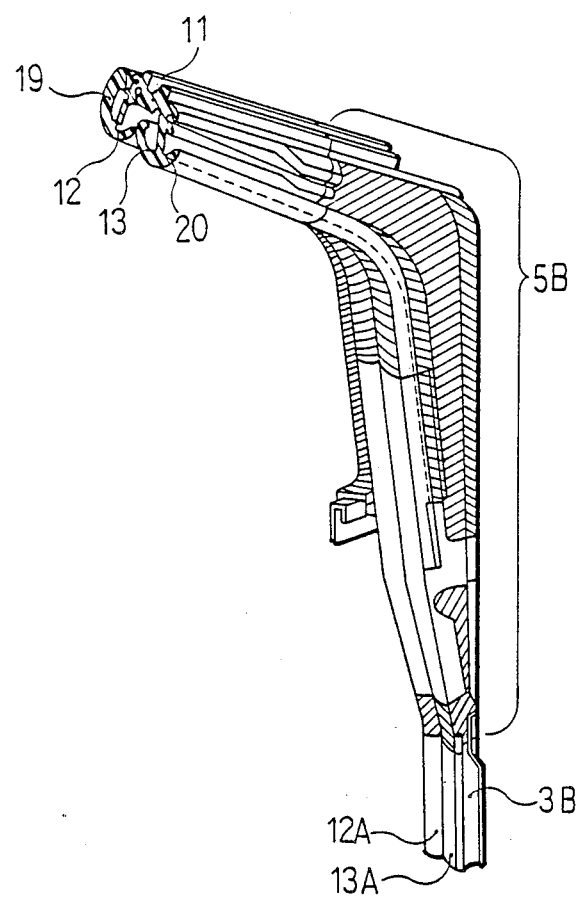
FIG. 6 is a perspective view showing an important portion of the glass-run manufactured in accordance with the method of the present invention.

The upper portion 1B differs from the lower portion 3B in sectional width and in sectional height, on which slidability-adding treatment has been performed at a grooved bottom portion 11 (11A) and at first and second slidable lips 12 and 13 (12A and 13A) form individual surface treated portions S (see FIG. 6).

Figure 7:
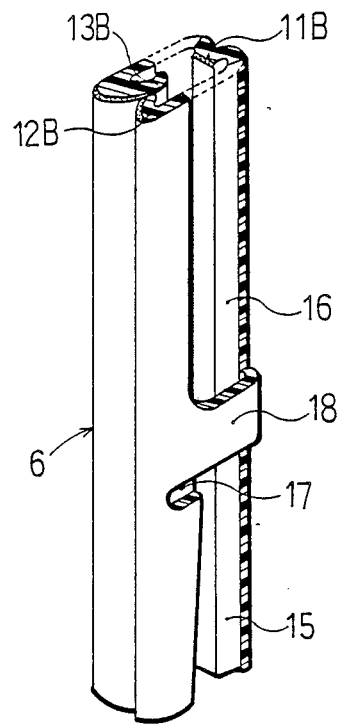
FIG. 7 is a fragmentary perspective view of a third extruded component with a portion notched which is used in manufacturing the glass-run shown in FIG. 5.
Figure 8:
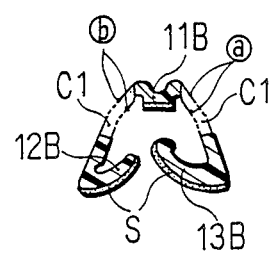
FIG. 8 is a sectional view of the third extruded component shown in FIG. 7, taken along line VIII—VIII of FIG. 10.
Figure 9:
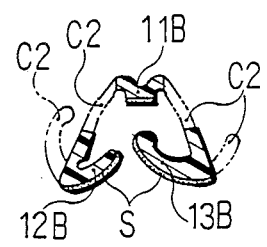
FIG. 9 is a sectional view of the fluid extruded component, taken along line IX—IX of FIG. 10.

In the molding step of this embodiment, a third extruded component 6 as shown in FIG. 7 is prepared in addition to the upper portion 1B and the lower portion 3B. This third extruded component 6 is cut to a length shorter than the entire length of the molded portion, which has a groove bottom portion 11B and first and second slidable lips 12B and 13B subjected to slidability-adding treatment (S), and longitudinal slits 15 and 16 formed so as to extend along the surface treated portions S from both ends toward an intermediate section. As shown in FIGS. 7 through 10, the third extruded component has a connecting-bridge portion 18 remaining in the intermediate section so as to assume a substantially H-shaped form in developed plan view, together with at least the surface treated portions including the grooved bottom portion 11B and the first and second slidable lips 12B and 13B. Although it is not necessary, the drawings show a lateral slit 17 for facilitating deformation when the component to be folded described below.

The thus prepared third extruded component 6 is set in a core 21 together with the upper portion 1B and the lower portion 3B as shown in FIG. 10 such that the individual surface treated portions of the third extruded component 6 are in line with the surface treated portions S of the first and second extruded components. Specifically, the one end of the grooved bottom portion 11B, and of the first and second slidable lips 12B and 13B of the third extruded component 6 are in line with the groove bottom portion 11, and first and second slidable lips 12 and 13 of the upper portion 1B respectively, whereas the other end of the groove bottom portion 11B, and of the first and second slidable lips 12B and 13B of the third extruded component 6 are in line with the groove bottom portion 11A, first and second slidable lips 12A and 13A of the lower portion 3B respectively.

Then, the foregoing components are set in a mold composed of an upper mold 22 and a lower mold 23, and first, second and third slide cores 25, 26 and 27 (see FIG. 11). Here, it should be noted that the mold is designed such that the plan taken along line VIII—VIII of FIG. 10 includes cavity sectional spaces C1 as illustrated by two-dot chain lines in FIG. 8 and the plan taken along line IX—IX of FIG. 10 includes cavity sectional spaces C2 as illustrated by two-dot chain lines in FIG. 9. Then, molding material is forced into the mold with such cavity spaces 19 by transfer molding or the like to mold the molded portion. In a manner similar to the above described method, the other molded portion arranged in the rear section of the door belt line B can be molded. Incidentally, a corner molded portion 7 is molded in accordance with the conventional method.

Although the thus manufactured glass-run includes non-treated portions in, for example, grooved bottom portions of the connecting portion between the upper portion and the lower portion, the length of such a non-treated portion is very short; thus, no slidability aftertreatment is needed because that a portion itself is not of practical significance.

Although in the foregoing embodiment the third extruded component is set in the mold after the longitudinal slits are formed along the surface treated portions, a molded portion of further complicated shape can be dealt with by forming slits similar to those of the third extruded component in respective connecting end portions of the first and second extruded components.

What is claimed is:

1. A method of manufacturing a weatherstrip comprising the steps of
   (a) providing a first extruded component and a second extruded component, each having surfaces treated portions,
   (b) inserting and setting in a mold the first extruded component and the second extruded component so as to define with the mold a mold cavity for forming a molded corner portion,
   (c) setting, in the mold cavity a third extruded component cut to a length less than a length of the mold cavity, said third extruded component having surface treated portions and being formed with separating slits extending along at least first and second opposed lateral surfaces from each end of said third extruded component to an intermediate section thereof, in such a manner that the surface treated portions of the third extruded component are in line with respective surface treated portions of the first and second extruded components, and
   (c) forcing molding material into the mold cavity to mold a molded connecting portion inclusive of the third extruded component, thereby connecting the first extruded component and the second extruded component by means of the molded connecting portion.

2. A method of manufacturing a weather strip according to claim 1, wherein the third extruded component has a transverse slit formed therein at an end of at least one of said separating slits.

* * * * *